M. B. HILL.
TEST INDICATOR.
APPLICATION FILED MAY 10, 1919.
1,411,725.
Patented Apr. 4, 1922.
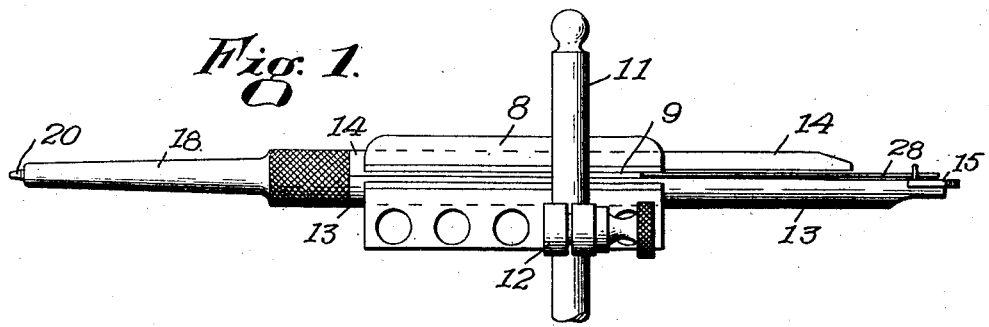
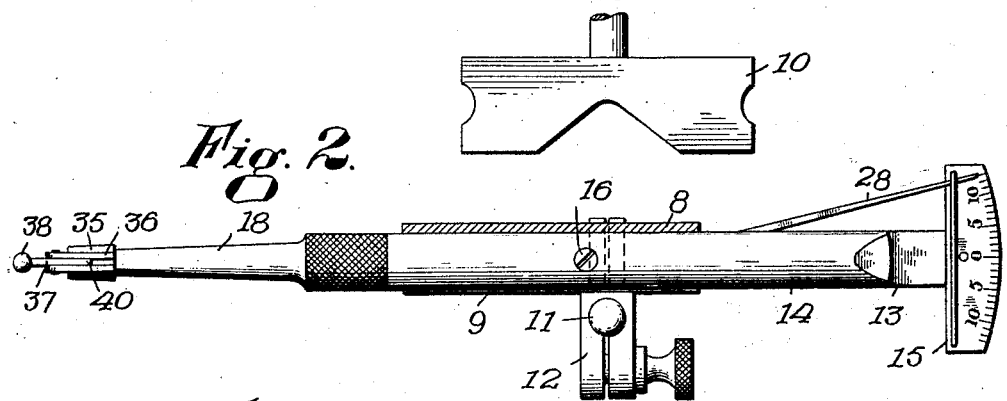
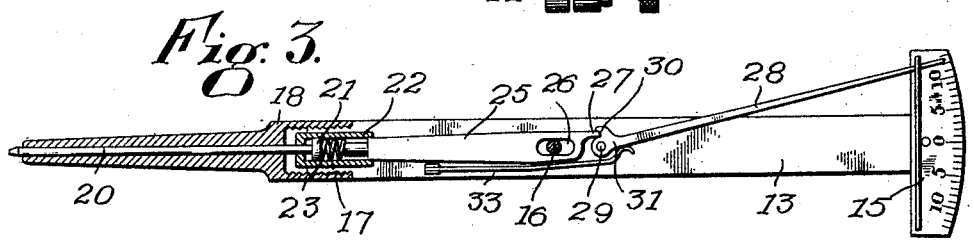
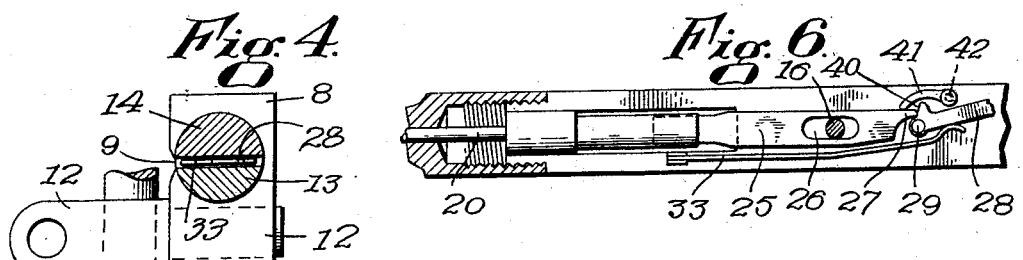
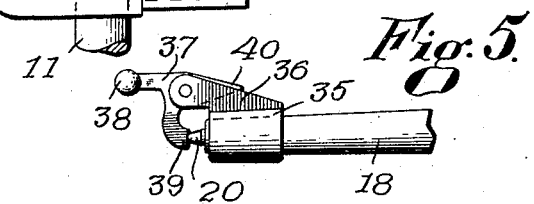
Inventor
Milton B. Hill.
By Attorneys
Southgate & Southgate

UNITED STATES PATENT OFFICE.

MILTON B. HILL, OF WORCESTER, MASSACHUSETTS.

TEST INDICATOR.

1,411,725.  Specification of Letters Patent.  Patented Apr. 4, 1922.

Application filed May 10, 1919. Serial No. 296,189.

*To all whom it may concern:*

Be it known that I, MILTON B. HILL, a citizen of the United States residing at Worcester, in the county of Worcester and State of Massachusetts, have invented a new and useful Test Indicator, of which the following is a specification.

This invention relates to a well-known type of micrometer test indicator used by machinists.

The principal objects of the invention are to provide a construction of body for supporting the indicating arm, needle and connecting parts consisting of two parts readily separable and reassembled in exact relation to each other; to provide the connections between the indicator arm and needle in such a form that they will lie in a single plane and therefore can be applied to a flat surface in their final locations, adjusted and brought into a proper working condition in a very simple and expeditious manner before the supporting body is assembled, this embodying a flat spring for operating the arm which involves improvements in several respects over the usual coil spring for this purpose. The invention also in its preferred form embodies the use of means by which, if the needle meets a sudden fixed obstruction, the mechanism will yield and thus avoid breaking or bending of the indicator arm, and in one form the invention comprises a device for adjusting the operating slide to insure its accurate operation of the indicator arm.

Reference is to be had to the accompanying drawings in which—

Fig. 1 is a side view of a test indicator constructed in accordance with this invention;

Fig. 2 is a plan of the same;

Fig. 3 is a plan of the lower half of the indicator, the cover being removed and the mechanism shown in place, the needle sleeve being shown in section;

Fig. 4 is an end view with parts in section;

Fig. 5 is a side view of the tip showing an additional feature, and

Fig. 6 is a view similar to Fig. 3 showing certain modified features.

I have shown the instrument as mounted on a stand comprising a base 10 and cylindrical upright 11 as is well understood. By means of a connection 12 adjustable on the upright, a block 8 is supported. This consists of a substantially rectangular member having a horizontal cylindrical passage and open all along one side at 9 to permit of its yieldingly holding by friction a cylindrical body formed of two semi-cylindrical members 13 and 14. The lower one has a scale 15 at one end and is provided with a guard. The cover 14 is semi-cylindrical in a general way but has its lower surface cut away so as to leave its side only in contact with the flat diametrical surface of the member 13. These are held together by a screw 16 and they have a screw-threaded end 17 on which screws a sleeve 18 to assist in holding them. The space between the two edges of the cover 14 is provided for reception of the operating parts which lie on the flat surface of the member 13.

In the sleeve 18 there is the usual needle 20. In my preferred form, I provide this with a head at 21 adapted to slide in a cylindrical guide 22. In this guide is located a stiff coil spring 23. The spring bears on the head 21 at one end and at the other on the end of a slidable bar 25, so that it transmits motion from the needle to the bar. The spring is normally intended not to yield so that the motion is transmitted without reduction. But if the needle strikes an obstruction or an unusual irregularity in the work the spring can yield so as to avoid injuring the parts.

The bar 25 has an elongated slot 26 through which passes the screw 16. It also has a projection 27 on the end which operates an indicating arm 28. This arm is pivoted at 29 and has a head 31 which directly engages the end of the bar 25. The projection 27 on the bar 25 engages in a notch 30 under an arm 42 on the indicating arm 28 and fits a curved surface under that arm so that although it has side play it cannot get nearer to or farther from the center of the pivot stud 29. This keeps it in place always in a very simple manner.

A spring 33 fixed to the flat surface of the member 13 engages the arm 28 and acts to hold it over to one end of the scale 15. It is to be observed that this is a flat spring, entirely independent of the pivot 29 and that it, with the arm 28, bar 25, and also the head 31, is located in a plane so that all these parts can be assembled on the flat surface of 13 before the instrument is finally set up, and the parts can be tested and then the cover 14 applied without interfering with any adjustment that has been made. This is a feature of importance in manufacture and assembling the parts as is also the fact that the application of the cover plate 14 by tightening up the screw 16 and placing the sleeve 18 on the split screw thread exactly positions this element.

I have also shown in Fig. 5 a removable attachment for gauging inside surfaces or the like. It involves a thimble 35 adapted to be applied frictionally to the sleeve 18 and having a bifurcated projection 36 in which is a pivot for the lever 37. This lever has a spherical end 38 for engaging the surface to be tested. The formation of this surface in this shape is a feature of importance because it will come into contact perpendicularly with any surface to be tested no matter what its angle. The lever has another arm provided with an end surface at 39 for engaging the end of the needle 20 and a third arm 40 which acts as a stop to prevent the lever from swinging back very far out of operative position.

In the form shown in Fig. 6 the arm 28 is provided with a flat surface 40 against which the projection 27 engages. There has to be a slight play between the screw 16 and the slot 26, and the distance of the projection 27 from the center of the pivot 29 cannot be changed, even in a slight degree, without greatly affecting the action of the arm 28. Therefore I provide a guide 41 for the side of the bar 25 to hold it against motion outwardly. This guide is pivoted at 42 on a stud, which fits tight enough to hold the guide in place by friction and yet allow it to be moved for adjustment.

It will be seen therefore that the block constitutes a convenient support in which the cylindrical body of the indicator is mounted so as to be adjusted circumferentially and longitudinally, that the indicator is held in it frictionally, and the provision of the longitudinal slot 9 permits of making the passage small enough so that a sufficient degree of friction is provided to hold it. The manufacture of the body 13—14 in two parts, one having a flat surface, is an important feature of the invention because it permits of the ready application of the parts in their final position without the necessity or danger of interfering with their adjustment when the device is finally set up. This reduces expense of manufacture and assembling. The use of the flat spring 33 is an improvement over the usual coil spring, because it permits of the location of the parts in a relatively small space and avoids the necessity of coiling a spring about the stud 29, thus enlarging the device laterally.

Although I have illustrated and described only two forms of the invention I am aware of the fact that modifications be made therein by any person skilled in the art without departing from the scope of the invention as expressed in the claims.

Therefore I do not wish to be limited to all the details of construction herein shown and described, but what I do claim is:

1. In an indicator of the character described, the combination of a supporting block having a longitudinal cylindrical passage therethrough open longitudinally all along one side, a cylindrical indicator body longitudinally and rotatably adjustable in said passage, and held therein by friction, an index arm movably carried by said body, and a needle longitudinally movable and having means for transmitting its longitudinal motion to said arm to swing it, independently supported by said body.

2. In an indicator, the combination of a supporting body, an index arm movably carried by said body, a needle, said body comprising two parts, one part having a flat surface against which the other part rests, and means resting on, and located substantially in the plane of, said flat surface for transmitting motion from the needle to the arm.

3. As an article of manufacture, an indicator having a cylindrical supporting body comprising two semi-cylindrical halves carrying an index arm between them and resting against the flat surface of one of said halves, and a needle for operating the arm.

4. In an indicator, the combination of a supporting body adjustably mounted and consisting of two semi-cylindrical halves, an index arm movably carried by said body, a needle, and a hollow sleeve for said needle screwing on the ends of said two halves.

5. In an indicator, the combination of a body made in two parts, having the complemental parts of a screw thread on the end thereof, a one-piece sleeve screwing on said thread to help hold said parts accurately together, and a needle passing through said sleeve and into a space between said parts.

6. In an indicator, the combination of two substantially semi-cylindrical parts, one having a flat diametrical surface and the other spaced from it at one end all the way across and part way across the center, an operating needle, an indicator arm, and means for connecting the needle and arm resting on said flat surface, said arm being movable across the space by which the end of one of said parts is separated from the other.

7. In an indicator, the combination of a body, having a screw thread on the end, a sleeve screwing on said thread on the body, a needle passing through said sleeve, a longitudinally movable bar in the body, and a pivoted indicator arm which the bar is adapted to move, said needle, arm and bar lying on a flat surface.

8. In an indicator, the combination of a body, a sleeve on said body, a needle passing through said sleeve, a longitudinally movable bar in the carrier, a pivoted indicator arm which the bar is adapted to move, and a spring between the needle and bar strong enough to be non-compressible under normal conditions but capable of yielding under super-normal strains.

9. In an indicator, the combination of a body, a needle passing into said body, a longitudinally movable bar on the body, a pivoted arm which the bar is adapted to move, a spring between the needle and bar strong enough to be non-compressible under normal conditions but capable of yielding under supernormal strains, the arm having a surface extending from the pivot against which the end of the bar engages; means for guiding the bar but permitting a slight lateral motion, and an adjustable guide for the side of the bar.

10. In an indicator, the combination of a body, a needle passing into said body, a longitudinally movable bar on the body, a pivoted arm which the bar is adapted to move, having a surface extending from the pivot against which the end of the bar engages, means for guiding the bar but permitting a slight lateral motion, and an adjustable guide for the side of the bar.

11. In an indicator, the combination of a body, a sleeve screwing on said body, a needle passing through said sleeve, a longitudinally movable bar in the body, a pivoted indicator arm which the bar is adapted to move, a coil spring between the needle and bar strong enough to be non-compressible under normal conditions but capable of yielding under super-normal strains, and a flat spring for moving the arm in one direction in opposition to the action of the needle.

12. In an indicator, the combination of a body, a sleeve on said body, a needle passing through said sleeve, a longitudinally movable bar in the body, a pivoted indicator arm which the bar is adapted to move, and a flat spring for moving the arm in one direction in opposition to the action of the needle.

13. In an indicator, the combination of a body, a sleeve on said body, a needle passing through said sleeve, a longitudinally movable bar in the body, a pivoted arm which the bar is adapted to move, and a spring bearing on said arm to force it in one direction about its pivot, said bar, arm, needle and spring all being located in the same plane.

14. In an indicator, the combination of a body, a sleeve on said body, a needle passing through said sleeve, a longitudinally movable bar in the carrier, a pivoted indicator arm which the bar is adapted to move, a collar detachably connected with said sleeve, and a three armed lever supported by the collar and having a substantially spherical indicating end on one arm, and a stop on another arm, the third arm being arranged and located to engage the end of said needle.

15. The combination with an indicator comprising a sleeve and needle therein, of an attachment frictionally mounted on the sleeve and comprising a pivoted three-armed lever having a sphere on one arm and the second arm substantially at right angles to the first arm and directly engaging the end of the needle and the third arm constituting a stop to prevent its getting out of operative position.

In testimony whereof I have hereunto affixed my signature.

MILTON B. HILL.